C. E. CURTISS.
WHEEL HOE.
APPLICATION FILED SEPT. 29, 1920.
1,428,581. Patented Sept. 12, 1922.
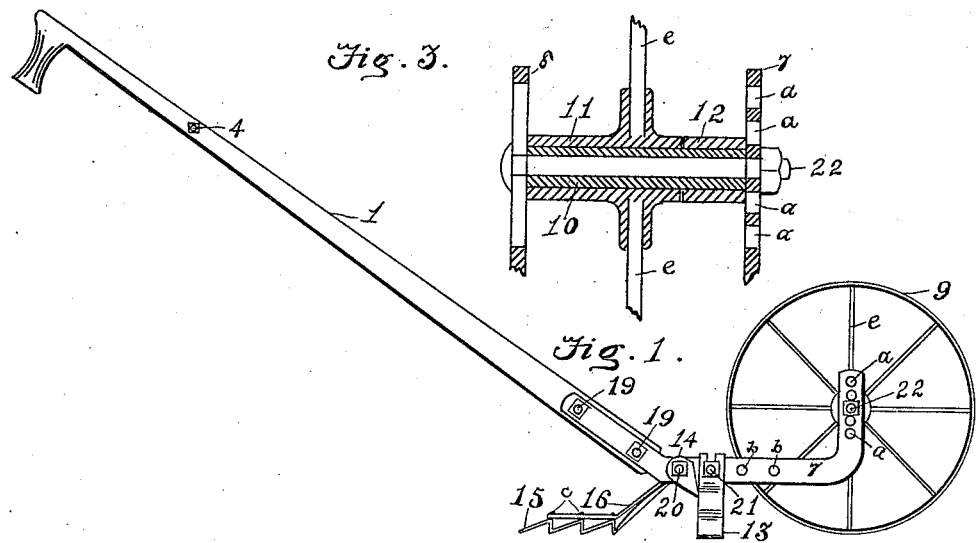
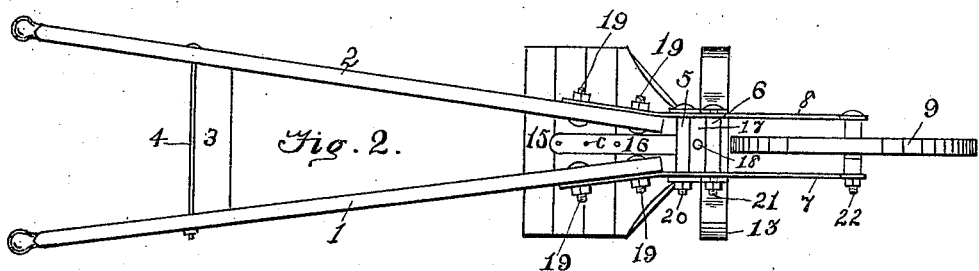
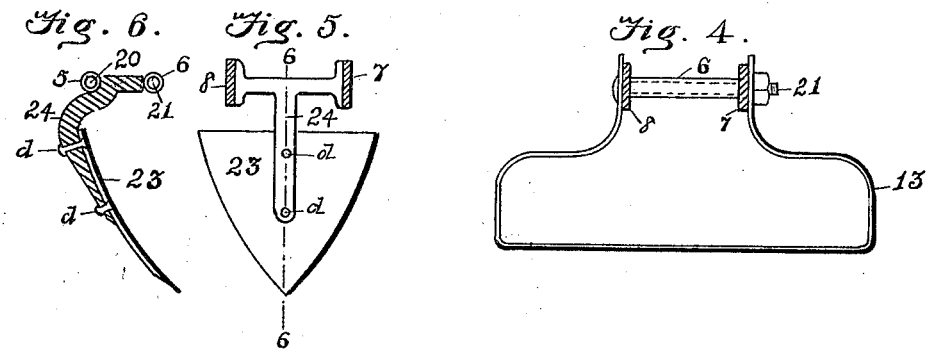
INVENTOR.
Charles E. Curtiss
BY
ATTORNEYS.

Patented Sept. 12, 1922.

1,428,581

UNITED STATES PATENT OFFICE.

CHARLES E. CURTISS, OF CLINTON, WISCONSIN.

WHEEL HOE.

Application filed September 29, 1920. Serial No. 413,584.

*To all whom it may concern:*

Be it known that I, CHARLES E. CURTISS, a citizen of the United States, residing at Clinton, in the county of Rock and State of Wisconsin, have invented an Improved Wheel Hoe, of which the following is a specification.

I hereby declare the following to be a full, clear, and exact description of the invention, such as will enable others skilled in the art to which it pertains to make and use the same.

This invention relates to hand wheel hoes in which a number of tillage elements interchange upon the same frame and may be used singly or in pairs.

The object of this invention is to provide a wheel hoe of simple construction, of light weight and of sufficient strength to withstand many years of continued service.

A further object of this invention is to provide for easy attachment to, and detachment from, the frame of a variety of tillage members and to provide for the necessary adjustments to adapt the wheel hoe to persons of different heights and also to provide for different depths of cut.

The prime object of this invention, however, is to provide a wheel hoe that will destroy weeds rapidly, and unusually close to the plant and also mulch, or fine the soil at a single passage with the least possible exertion upon the part of the operator, these objects and also others which will appear in this specification, are attained in this invention.

A full understanding of the invention may be had by reference to the following description and the accompanying drawings, in which Fig. 1 is a side view of the wheel hoe complete with tillage blade and pulverizer attached in a working position; Fig. 2 is a top view of the same combination shown in Fig. 1; Fig. 3 is a detail, partly in section, showing the manner in which the ground wheel is constructed and mounted in the frame; Fig. 4 shows the form of the tillage blade and the manner of mounting the same upon the frame; Fig. 5 is a rear view of a ditcher blade and shank attached and Fig. 6 is a sectional view of the same on line 6—6 of Fig. 5.

Like characters refer to corresponding parts throughout the several views.

The frame of this wheel hoe consists of a pair of handles, 1 and 2, terminating, upwardly, in pistol grips, and toward their upper end provided with shallow mortises, on their inner sides, to receive the ends of the cross bar, 3, just above the upper end of the mortises are holes to receive the frame bolt, 4, upon the lower extremities of the handle metal side bars are secured by means of bolts, 19—19, the handles are spaced at a convenient distance at their upper ends and are retained in proper relation to each other by means of the cross bar, 3, and the through bolt, 4, the handles are brought closer together at their lower ends and are held securely by a bolt, 20, which passes through both side bars, 7 and 8, and also through a hollow scaper, 5, the rear end of each side bar is bent upward and slightly outward and bolted to the lower extremity of the respective handles, as mentioned above, the result of thus bending the rear ends of the side bars is to bring the body portion of the side bars into parallelism both to surface of the ground and to the longitudinal center line of the implement. At the front end, the side bars, 7 and 8, are turned up, substantially at right-angles to the horizontal portion, these upturned ends of the side bars are apertured, toward their upper terminals, the right, 7, having a series of holes, while the left, 8, has a corresponding long slot, by means of these openings the frame is raised and lowered upon the wheel; the reason for having a series of holes in the side 7 and a long slot in the side 8, is to allow for vertical adjustment of the frame without removing the bolt, 22, from the wheel bushing 10. The horizontal portion of each side bar has a series of holes, *b—b*, which register when the side bars are superimposed, these holes receive the fastening bolts which secure the frame and the various tillage tools. It will be seen that this method of construction results in a very stiff, light frame the two principal parts of which being rigidly connected at several points; viz, near the two extremes and at one or more intermediate points.

Primarily, this wheel hoe is a weed exterminator and mulcher and the strap hoe or tillage blade, 13, is the tool most used throughout the tillage season; this blade overhangs the frame, to a considerable extent, on either side, hence its working point is in clear view of the operator, the working point being determined by the outer vertical portion of the blade which serves as a guide. This blade, 13, is secured to the frame by means of a single bolt, 21, which passes through both side bars, 7 and 8, the frame spacer, 6, and both extensions of the blade itself, ordinarily this is sufficient fastening to retain the blade in any desired position of adjustment, relative to the frame, which is necessary to meet the varying conditions of tillage, however, a stop, 14, is furnished on either side of the frame and retained in place by means of frame bolt 20, to be used in case of severe strain upon the blade as in very hard ground.

In Figs. 1 and 2 is shown, in the rear of the tillage blade, a pulverizer consisting of a corrugated sheet metal pan, 15, strengthened by means of a flat piece of somewhat elastic metal, 16, which is secured to the pan by the rivets, c—c, to this piece is firmly fixed a block, 17, by use of bolt or rivet, 18, which is slightly longer than the distance between the side bars, 7 and 8; in order to attach the pulverizer to the frame the nuts on bolts 20 and 21 are loosened, slightly, the block is slipped up between the side bars and nuts tightened, the friction developed between the side bars is then sufficient to hold the pan in any desired position of adjustment. The pulverizer may be used with or without the tillage blade, to crush lumps, rub small weeds down after they are cut by the blade, or to cover seeds sown in open drills.

In Figs. 5 and 6 is shown a furrow opener or ditcher. This consists of a shovel, 23, attached to a shank, 24, by means of rivets, d—d, the shank terminates upwardly in an integral block which is clamped between the side bars, 7 and 8, by means of bolts 20 and 21, in the same manner as has been explained for attachment of pulverizer to the wheel hoe frame; a plow, or rake, or set of cultivator teeth, not shown, may be attached to, or detached from this wheel hoe frame in the same manner, without removal of the fastening bolts or nuts.

The attachment of two tillage blades, tandem, is effected by the use of bolts 20 and 21, loosen the nuts two or three turns, slip the slotted extensions of tillage blades over the bolts, adjust blades to desired depth and angle and tighten nuts, this combination tends to produce fine soil as the blades may be set to cut at different depths, hence the soil will be cut in thin slices thus producing a fine mulch.

The wheel, 9, is mounted between the upturned ends of the side bars, 7 and 8, by means of a bolt, 22, which passes through the side bars and also through a bushing, 10, which fits loosely within the wheel hub, 11, the wheel hub proper extends farther from the wheel center on one side than the other, the shortage of the hub on one side the center is made up by the use of a loose sleeve, 12. By changing this sleeve from one end of the wheel hub to the other the wheel is moved close to one side of the frame, which is sometimes of advantage to give more clearance between wheel and row of plants.

The handles, 1 and 2, have been referred to as terminating in pistol grips, this form of handhold for a wheel hoe has advantages; it provides a bearing for the entire hand, hence, does not irritate the palms in continued use; this grip may be grasped by three fingers, the first finger extending along the handle. This gives most perfect control of the implement, which is quite necessary in doing close work in weeding small plants.

From the foregoing, taken in connection with the drawings, the construction of the various parts, the adjustments and use of the several combinations constituting my invention, will be readily understood.

What is claimed is:—

1. In an implement of the character described, having a wheel supported frame, a metal pan attached thereto in operative position beneath said frame, said pan presenting transverse alternating ridges and depressions to the ground surface for the purpose specified.

2. In an implement of the character described, having a wheel supported frame, a transverse horizontal blade, widely overhanging and attached to said frame in close proximity to the wheel and a pan, having transverse alternating ridges and depressions upon its lower side, attached to said frame, in operative position, rearwardly of said horizontal blade, substantially as set forth.

3. In an implement of the character described, having a wheel supported frame, a wheel axle mounted in said frame, a bushing upon said axle, a movable sleeve and a ground wheel mounted upon said bushing, said ground wheel having a hub of different lengths relative to its center line, substantially as shown and for the purpose specified.

4. In an implement of the character described, a wheel supported frame having a pair of parallel side bars, a ground working toolshank adapted by means of a double flanged integral head to be retained in any desired position by frictional contact with the inner surfaces of said side bars of said wheel supported frame, said frictional contact being produced by means of two through bolts, one at either side of the head of said shank, substantially as shown and described.

5. In an implement of the character described, a frame comprising a pair of side bars having their horizontal middle portions in parallel spaced relation and provided with means for the attachment of ground working tools, said side bars terminating forwardly in, substantially vertical, upturned portions for the reception of a ground wheel axle, one of said side bars having a series of holes within its upturned portion and the other side bar having a slot similarly situated and corresponding in length to the distance between the extreme holes in the other side bar, the rear end portions of said side bars being bent upwardly and outwardly for the reception of operating handles, all substantially as set forth.

6. The combination, in a wheel hoe, having a wheel supported frame, of a corrugated pan, having alternating parallel ridges and depressions, means connecting said corrugated pan beneath said frame and a ground working tool adjustably mounted upon said frame in advance of said corrugated pan all substantially as set forth.

7. The combination, in a wheel hoe, of a frame including side members having upturned, apertured fore and aft terminals, a ground wheel adjustably mounted within the forward upturned portions of said side members, handles secured to the rear terminals of said members, a ground working tool positioned upon said frame immediately behind said ground wheel and a corrugated pan positioned to the rear of said ground working tool and secured to said frame in operative position all substantially as set forth.

In testimony whereof I have affixed my signature in the presence of two witnesses.

CHARLES E. CURTISS.

Witnesses:
 FRANCES CONLEY,
 MABEL HARTSHORN.